United States Patent Office 3,007,916
Patented Nov. 7, 1961

3,007,916
PREPARATION OF COBALAMINS
Konrad Bernhauer and Siegfried Spaude, Aschaffenburg, Germany, assignors to Hoffmann-La Roche Inc., Nutley, N.J., a corporation of New Jersey
No Drawing. Filed Jan. 28, 1960, Ser. No. 5,114
Claims priority, application Switzerland Feb. 6, 1959
3 Claims. (Cl. 260—211.5)

This invention relates to novel chemical processes. More particularly, it relates to novel processes of producing cobalamins.

Broadly, the invention provides processes of making hydroxo(aquo)-cobalamins which comprise reducing a complete (i.e. nucleotide-containing) cyanocobalamin with a titanium(III) compound, separating hydrocyanic acid which is formed in the reaction from the reduced cyanocobalamin, and oxidizing the latter. The term "complete cobalamin" (alternatively, "nucleotide-containing cobalamin") refers to the classification of Bernhauer et al., Angew. Chemie 66, 776 (1954); i.e. to distinguish from the "incomplete cobalamins" (or "nucleotide-free cobalamins") which are also discussed in that paper, see particularly the table at page 779 thereof.

The reduction reaction is advantageously effected in aqueous medium, and by employing a salt which furnishes trivalent titanium ions, e.g. titanium trichloride. The reaction can be effected either in an acidic medium or in a neutral medium, and preferably is effected in a pH range between about pH 2 and about pH 7. When the reaction is carried out in acidic solution, e.g. at pH 2, the titanium (III) ion is converted to titanium (IV) ion in solution, i.e. without formation of any appreciable precipitate. This mode of operation is advantageously employed in cases where it is desired to obtain the cobalamin, produced by the processes of the invention, in the form of a precipitate; inasmuch as, after precipitation and isolation of the cobalamin product, the titanium ions can be removed by washing the precipitate. When a neutral solution is employed, i.e. when operating at pH 7, upon addition of titanium (III) ions there is first formed a blue-black precipitate of titanium (III) oxide hydrate; the latter, upon reduction of the cobalamin, is converted to titanium (IV) oxide hydrate, which can be filtered off. The last described mode of operation is advantageously employed in cases where it is desired to obtain the cobalamin product in the form of a solution.

The conversion of the titanium from the trivalent to the tetravalent state is accompanied by simultaneous reduction of the cobalamin starting material. At the same time, the color of the solution changes from red to brown. The reduction is effected at the central cobalt atom, which passes from the trivalent to the divalent state. Thereby, the cyanide ion bound to the cobalt atom is liberated, in the form of hydrocyanic acid. The hydrocyanic acid thus liberated is then separated from the reduced cobalamin, while the central cobalt atom in the latter is still in its divalent state. An appropriate measure for this purpose comprises expelling the hydrocyanic acid by vigorously blowing an inert gas, such as carbon dioxide or nitrogen, through the HCN-containing solution. The duration of the blowing step depends upon the size of the apparatus and the velocity and quantity of the gas blown through the solution. Ordinarily, two to three hours of blowing suffice for quantitative removal of the hydrocyanic acid. An alternative method for separating hydrocyanic acid from the reduced cobalamin comprises retaining the hydrocyanic acid in solution while precipitating the reduced cobalamin from the solution, filtering off the solution containing hydrocyanic acid and titanium ions, and washing the precipitate in order to remove residual traces of hydrocyanic acid and titanium ions.

The oxidation of the reduced cobalamin intermediate, formed by treatment with the titanium compound, is advantageously effected by using air as the oxidizing agent; precautions being taken to exclude the presence of cyanide ion. In cases where the reduced cobalamin is present as an aqueous solution thereof, the oxidation can be effected by blowing air through the aqueous solution. On the other hand, if the reduced cobalamin intermediate is separated as a precipitate, the oxidation can be effected by blowing air through the precipitate (advantageously obtained in the form of a kieselguhr adsorbate) while still on the filter. In the oxidation step, the brown color of the reduced cobalamin intermediate is converted to the red color of the hydroxo(aquo)-cobalamin desired product.

The complete hydroxo(aquo)-cobalamins obtained by the processes of the invention are in general known products, possessing vitamin $B_{12}$ activity, and having known utility, e.g. as medicinal agents and as additives for foodstuffs and feedstuffs.

The invention is further disclosed in the following examples, which are illustrative but not limitative thereof.

*Example 1*

507 mg. of crystalline 5,6-dimethylbenzimidazole-cyanocobalamin (vitamin $B_{12}$) having a purity of 96.5% is dissolved in 50 ml. of water and mixed with 1 ml. of an aqueous 15% (w./w.) titanium trichloride solution. The pH value is adjusted to 7.0 by addition of dilute aqueous sodium hydroxide solution, whereupon blue-black titanium (III) oxide hydrate precipitates; the latter, while passing to white titanium (IV) oxide hydrate, converts the cyanocobalamin starting material to a brown reduction product (vitamin $B_{12_r}$). Then 0.2 g. of sodium bicarbonate is added, and carbon dioxide is blown through the reaction mixture for two hours; the pH value is then between 6.5 and 7. Air is blown through the solution until the brown intermediate product has been converted to red hydroxo-cobalamin and excess titanium (III) oxide hydrate has been converted to titanium (IV) oxide hydrate. The precipitate of titanium (IV) oxide hydrate is filtered off with suction and washed with water, the washings being added to the filtrate. There is obtained a total of 100 ml. of aqueous solution, which is adjusted to pH 7.0 and then dried in vacuo. The residue is extracted with a total of 200 ml. of methanol in order to remove salts, and the extract is evaporated to dryness. The dry residue is taken up in a mixture of 80% acetone and 20% water and is crystallized by addition of acetone. There is obtained 455 mg. of 5,6-dimethylbenzimidazole-hydroxo(aquo)-cobalamin (vitamin $B_{12_a}$, cf. U.S. Patent 2,738,301), having a purity of 96.0%.

*Example 2*

1 g. of crystalline 5-hydroxybenzimidazole-cyanocobalamin (factor III) having a purity of 96.0% is dissolved in 100 ml. of water and mixed with 2 ml. of 15% (w./w.) aqueous titanium trichloride solution. The pH value is adjusted to 2.0 by addition of dilute aqueous hydrochloric acid solution and a vigorous current of nitrogen is blown through the solution for three hours. Then air is blown through the solution until the brown color has disappeared. The solution is adjusted to pH 7.0 by addition of dilute aqueous sodium hydroxide, thereby precipitating titanium (IV) oxide hydrate. The precipitate is filtered off and washed, and the combined filtrate and washings are evaporated to dryness and taken up in a mixture of 80% acetone and 20% water. Acetone is then added until crystallization sets in. There is thus obtained 850 mg. of 5-hydroxybenzimidazole-hydroxocobalamin having a purity of 95.0%.

Example 3

2 g. of crystalline 5,6-dimethylbenzimidazole-cyanocobalamin (vitamin $B_{12}$) having a purity of 97.3% is dissolved in one liter of water and 20 g. of kieselguhr is added. The pH value is adjusted to 2.0 by addition of dilute aqueous hydrochloric acid. The reduction is effected by addition of 5 ml. of an aqueous 15% (w./w.) titanium trichloride solution. Then 22 g. of p-chlorophenol is added, the air in the reaction vessel is displaced with nitrogen, and the vessel is closed. After shaking for one-half hour, the brown precipitate formed is filtered by suction (the kieselguhr preparation is obtained generally according to the method described in German Federal Republic "Auslegeschrift" 1,016,898). The precipitate is washed on the filter. As the first wash solution there is employed a solution of 2.2% (w./w.) p-chlorophenol in water, adjusted to pH 2.0 by addition of dilute aqueous hydrochloric acid solution, to which a few drops of the above described titanium trichloride solution have been added until the formation of a violet coloration. Then the precipitate is washed with the above mentioned 2.2% p-chlorophenol solution (pH 2, but to which no titanium trichloride has been added). Air is thereupon blown through the precipitate until the brown color of the reduced cobalamin intermediate has been converted to the red color of the desired hydroxocobalamin. The precipitate is then washed with acetone until all p-chlorophenol has been removed. The kieselguhr product is percolated in a short column filled with aluminum oxide by means of a solution of 80% acetone and 20% water, 860 ml. of percolate being obtained. Acetone is added until the onset of crystallization. The yield of 5,6-dimethylbenzimidazole-hydroxocobalamin (vitamin $B_{12_a}$) obtained amounts to 1.823 g. purity, 96.6%).

We claim:

1. A process for the production of hydroxo (aquo)-cobalamins which comprises reducing at a pH range between about pH 2 and about pH 7 a complete cyanocobalamin with a titanium (III) salt which furnishes trivalent titanium ions, separating the reduced cobalamin from the hydrocyanic acid which is formed in the reaction, and oxidizing the cobalamin intermediate.

2. A process for the production of vitamin $B_{12_a}$ which comprises reducing at a pH range between about pH 2 and about pH 7 vitamin $B_{12}$ with a titanium (III) salt which furnishes trivalent titanium ions, separating vitamin $B_{12_r}$ from the hydrocyanic acid which is formed in the reaction, and oxidizing the vitamin $B_{12_r}$.

3. A process for the production of 5-hydroxybenzimidazole-hydroxocobalamin which comprises reducing at a pH range between about pH 2 and about pH 7 factor III with a titanium (III) salt which furnishes trivalent titanium ions, separating the reduced cobalamin intermediate from the hydrocyanic acid which is formed in the reaction, and oxidizing the cobalamin intermediate.

References Cited in the file of this patent

UNITED STATES PATENTS 2,738,301    Kaczka et al.     Mar. 13, 1956